US011897264B2

(12) United States Patent
Kamiya

(10) Patent No.: US 11,897,264 B2
(45) Date of Patent: Feb. 13, 2024

(54) LIQUID APPLICATION UNIT AND LIQUID APPLICATION APPARATUS

(71) Applicant: NTN CORPORATION, Osaka (JP)

(72) Inventor: Kouhei Kamiya, Iwata (JP)

(73) Assignee: NTN CORPORATION, Osaka (JP)

( * ) Notice: Subject to any disclaimer, the term of this patent is extended or adjusted under 35 U.S.C. 154(b) by 105 days.

(21) Appl. No.: 17/428,928

(22) PCT Filed: Feb. 3, 2020

(86) PCT No.: PCT/JP2020/003853
§ 371 (c)(1),
(2) Date: Aug. 5, 2021

(87) PCT Pub. No.: WO2020/162381
PCT Pub. Date: Aug. 13, 2020

(65) Prior Publication Data

US 2022/0126573 A1 Apr. 28, 2022

(30) Foreign Application Priority Data

Feb. 8, 2019 (JP) ................................ 2019-021681

(51) Int. Cl.
*B41J 2/14* (2006.01)

(52) U.S. Cl.
CPC .................................. *B41J 2/1433* (2013.01)

(58) Field of Classification Search
CPC . B41J 2/1433; B41J 2/135; B41J 2/162; B41J 2002/14411
See application file for complete search history.

(56) References Cited

U.S. PATENT DOCUMENTS

2007/0040870 A1* 2/2007 Lu .......................... B41J 2/1433 347/68
2011/0049265 A1 3/2011 Vedrine
2016/0251126 A1 9/2016 Iwasaki et al.
2018/0042766 A1 2/2018 Nagao et al.
2018/0359861 A1 12/2018 Yamanaka

FOREIGN PATENT DOCUMENTS

CN 1873477 A 12/2006
CN 101970305 A 2/2011
CN 104284685 A 1/2015
(Continued)

OTHER PUBLICATIONS

International Search Report issued in corresponding International Patent Application No. PCT/JP2020/003853, dated Mar. 10, 2020, with English translation.

(Continued)

*Primary Examiner* — Jason S Uhlenhake
(74) *Attorney, Agent, or Firm* — Rimon, P.C.

(57) ABSTRACT

A liquid material unit capable of applying a liquid material having a high viscosity stably for a long time includes an application needle and a liquid material container. The liquid material container stores the liquid material. The liquid material container has a space that stores the liquid material and a hole that allows the application needle to pass through the space. A wetting and spreading suppressing structure for the liquid material is disposed at the periphery of the hole in the liquid material container.

5 Claims, 9 Drawing Sheets

(56) References Cited

FOREIGN PATENT DOCUMENTS

| | | | | | |
|---|---|---|---|---|---|
| CN | 204892180 | | | 12/2015 | |
| CN | 105658414 | A | | 6/2016 | |
| JP | 2007-268353 | A | | 10/2007 | |
| JP | 2009-122259 | A | | 6/2009 | |
| JP | 2012-101175 | A | | 5/2012 | |
| JP | 2016-166045 | A | | 9/2016 | |
| JP | 2017-094286 | A | | 6/2017 | |
| JP | 2017-225923 | A | | 12/2017 | |
| JP | 2018-94502 | A | | 6/2018 | |
| WO | 2013/112380 | A2 | | 8/2013 | |
| WO | 2016/199696 | A1 | | 12/2016 | |
| WO | 2017/090381 | A1 | | 6/2017 | |
| WO | 2018/043537 | A1 | | 3/2018 | |
| WO | WO-2018043537 | A1 | * | 3/2018 | ............... B05C 1/02 |

OTHER PUBLICATIONS

Chinese Office Action issued in corresponding Chinese Patent Application No. 202080013181.5, dated Aug. 16, 2022, with English translation.

* cited by examiner

LIQUID APPLICATION UNIT AND LIQUID APPLICATION APPARATUS

CROSS REFERENCE TO RELATED APPLICATIONS

This patent application is the U.S. National Phase under 35 U.S.C. § 371 of International Application No. PCT/JP2020/003853, filed on Feb. 3, 2020, which claims the benefit of Japanese Patent Application No. 2019-021681, dated Feb. 8, 2019, the entire contents of each are hereby incorporated by reference in their entirety.

TECHNICAL FIELD

The present invention relates to a liquid application unit and a liquid application apparatus.

BACKGROUND ART

Printed electronics technology for forming minute circuits such as RFID tags by printing (application) systems have been rapidly developed. In printed electronics technology, a system including an application needle is one of the choices in that it enables fine application using materials in a wide range of viscosities.

One of methods of performing fine application using an application needle is a method using an application unit as described in Japanese Patent Laying-Open No. 2007-268353 (PTL 1). In this application unit, a through hole is provided at the bottom face of a liquid material container. An application needle that can be moved up and down in the through hole is arranged for applying a liquid material. A liquid material in the liquid material container adheres to the tip end of the application needle and is transferred to a surface of a substrate serving as an application target. In the liquid material in the liquid material container, the surface tension at the edge of a hole through which the application needle of the liquid material container protrudes and the pressure by the weight of the liquid material in the liquid material container are in balance. The liquid material in the liquid material container therefore does not leak to the outside through the hole in the liquid material container.

CITATION LIST

Patent Literature

PTL 1: Japanese Patent Laying-Open No. 2007-268353

SUMMARY OF INVENTION

Technical Problem

The application unit disclosed in Japanese Patent Laying-Open No. 2007-268353 enables application to a minute region using liquid materials in a wide range of viscosities. However, when a liquid material containing metal powder with a high viscosity and a large mean specific gravity is applied, the liquid material wets and spreads on the periphery of the hole through which the application needle of the liquid material container protrudes, as a result of repeating application multiple times, thereby forming liquid accumulation. This liquid accumulation changes the amount of liquid material adhering to the tip end of the application needle. Accordingly, the amount of application of the liquid material to the application target may vary. According to Japanese Patent Laying-Open No. 2007-268353, therefore, it seems to be difficult to apply a liquid material having a high viscosity stably for along time. However, in order to draw a minute circuit such as an RFID tag, it is necessary to apply a liquid material having a high viscosity stably for a longtime.

The present invention is made in view of the problem above. An object of the present invention is to provide a liquid material unit and a liquid application apparatus capable of applying a liquid material having a high viscosity stably for a long time.

Solution to Problem

A liquid application unit according to the present invention includes an application needle and a liquid material container. The liquid material container stores a liquid material. The liquid material container has a space that stores the liquid material and a hole that allows the application needle to pass through the space. A wetting and spreading suppressing structure for the liquid material is disposed at the periphery of the hole in the liquid material container.

Advantageous Effects of Invention

According to the present invention, the wetting and spreading suppressing structure for a liquid material enables a liquid material having a high viscosity to be applied stably for a long time.

DESCRIPTION OF EMBODIMENTS

Figure 1:
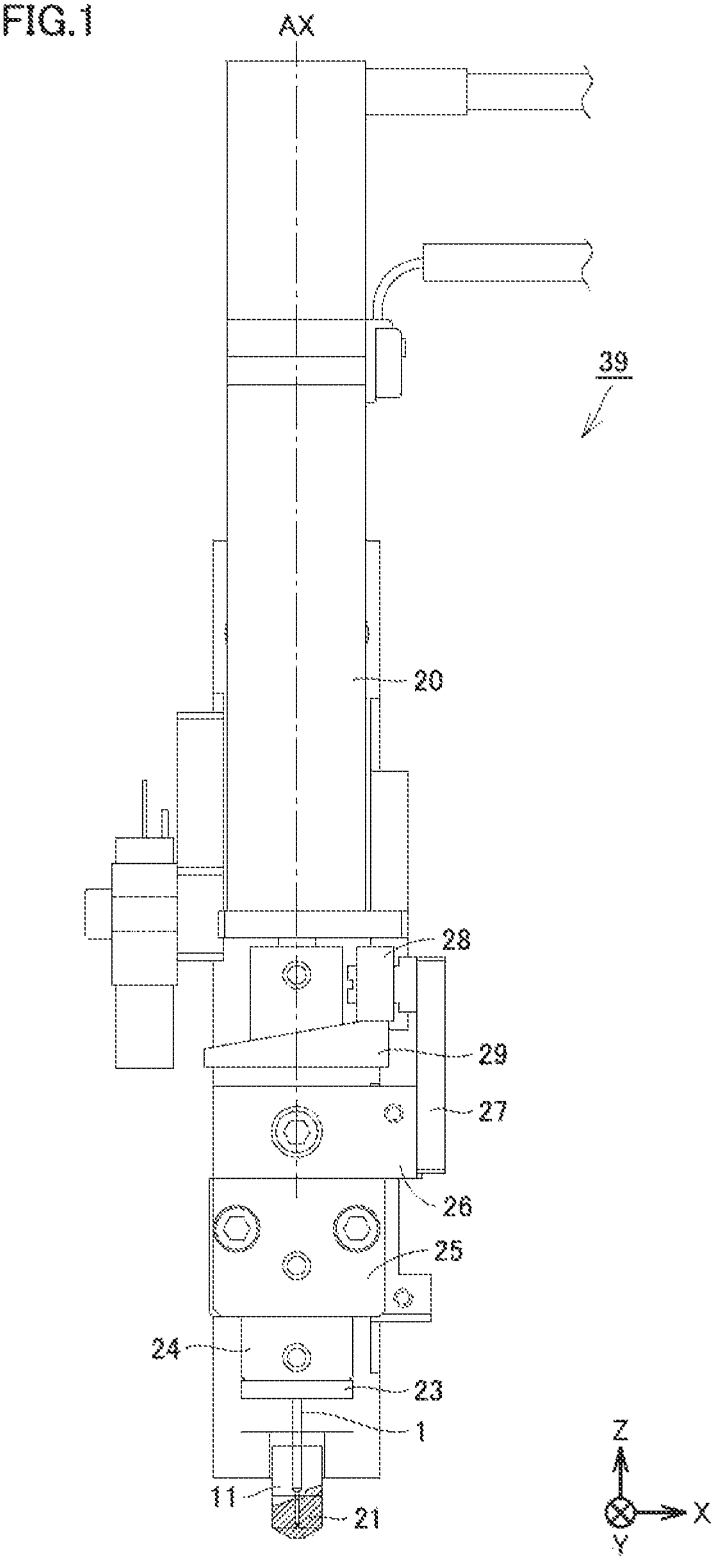
FIG. 1 is a front view of a liquid application unit according to a first embodiment as viewed from the negative Y direction.

Embodiments of the present invention will be described below with reference to the drawings. Like or corresponding parts in the following drawings are denoted by like reference numerals and a description thereof will not be repeated.

First Embodiment

<Configuration of Liquid Application Unit>

Figure 2:
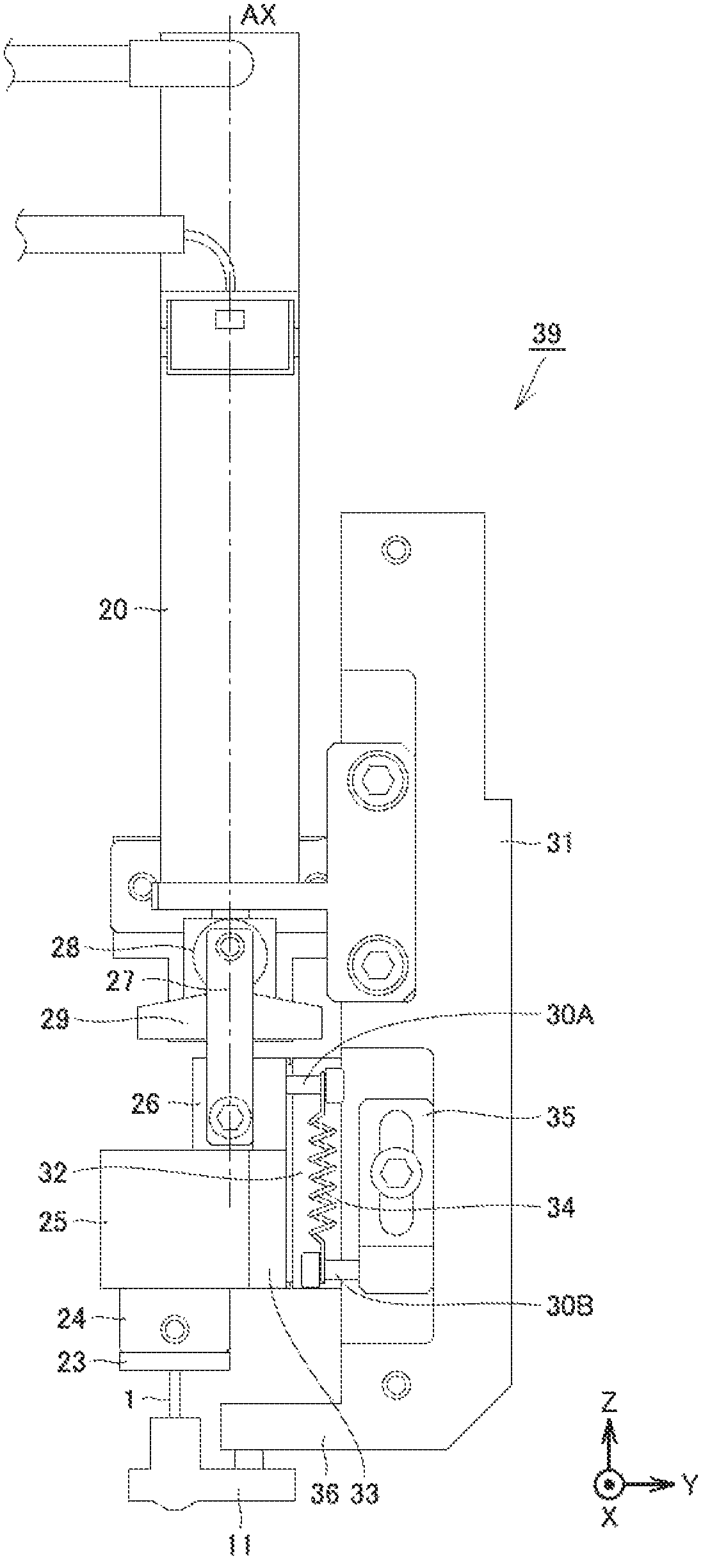
FIG. 2 is a side view of the liquid application unit according to the first embodiment as viewed from the positive X direction.

FIG. 1 is a front view of a liquid application unit according to a first embodiment as viewed from the negative Y direction. FIG. 2 is a side view of the liquid application unit according to the first embodiment as viewed from the positive X direction. In other words, FIG. 1 and FIG. 2 show the same liquid application unit. In the following description, the X direction, the Y direction, and the Z direction are introduced for convenience of explanation. Referring to FIG. 1 and FIG. 2, the liquid application unit in the present embodiment applies a liquid material 21 to a surface of a substrate or the like serving as a target, using an application needle 1. The liquid application unit mainly includes application needle 1, a liquid material container 11, and a servo motor 20. It is noted that the liquid application unit includes many members other than those described above. A wetting and spreading suppressing structure, which is a characteristic part of the present embodiment, will be detailed later.

Liquid material container 11 is a member that accommodates and retains, that is, stores liquid material 21 in its inside. Application needle 1 is a member for supplying liquid material 21 in liquid material container 11 onto a target. Application needle 1 is an elongated member extending along the Z direction. The lowermost portion in the Z direction of application needle 1 has any shape, such as a corner portion, a curved portion, or a flat portion. The tip end of application needle 1 has a tapered portion that narrows toward the tip end (that is, the area of a cross section vertical to the axial line decreases as it goes toward the lower side in the Z direction and approaches the tip end).

In the liquid application unit in the present embodiment, application needle 1 directly applies liquid material 21, for example, onto a surface of a target from liquid material container 11. This will be described below.

The liquid application unit includes, in addition to liquid material container 11 described above, an application needle holder 23, an application needle holder housing 24, and an application needle holder fixing part 25. Application needle holder housing 24 is fixed to the lower end of application needle holder fixing part 25. A depression (not shown) is formed at the lower end of application needle holder housing 24. The upper end of application needle 1 is fixed vertically to the center of the lower end of application needle holder 23. A projection (not shown) is formed at the top of application needle holder 23. The projection of application needle holder 23 is fitted in the depression of the application needle holder housing 24 so that application needle holder 23 is aligned with application needle holder housing 24. Application needle holder 23 is fixed to application needle holder housing 24 by screws.

Application needle holder fixing part 25 is attached to the lower end of a movable part 26. Movable part 26 is coupled to a bearing 28 through a cam coupling plate 27. Bearing 28 is arranged so as to be installed on the uppermost surface in the Z direction of a cam 29. Servo motor 20 is arranged above cam 29. Servo motor 20 has a rotation axis AX extending along the Z direction. Servo motor 20 is rotatable around rotation axis AX.

Cam 29 is attached to rotation axis AX of servo motor 20. Cam 29 is thus rotatable around rotation axis AX of servo motor 20. Cam 29 has a center portion and a flange portion arranged on the outer periphery of the center portion. The lowermost surface with respect to the Z direction of cam 29 extends in the horizontal direction along the XY plane. On the other hand, the uppermost surface with respect to the Z direction of the flange portion of cam 29 varies in position (for example, is lower) with respect to the Z direction, for example, according to the position with respect to the X direction or the Y direction. In this way, the uppermost surface with respect to the Z direction of the flange portion of cam 29 has an inclined shape relative to the XY plane. In FIG. 1, as an example, the uppermost surface of the flange portion of the cam is shaped such that the position in the Z direction is lower on the X-direction negative side than on the X-direction positive side.

When cam 29 with the uppermost surface having such an inclined shape rotates around rotation axis AX, bearing 28 installed on the uppermost surface of the flange portion of cam 29 moves in the up-down direction with respect to the Z direction. This is because the rotation of cam 29 with the flange portion of the uppermost surface having an inclined shape changes the Z-direction position of the uppermost surface of cam 29 equipped with bearing 28.

When the rotation of cam 29 changes the position in the Z direction of bearing 28, the position in the Z direction of cam coupling plate 27 and movable part 26 coupled thereto also changes. Application needle holder fixing part 25 is attached to the lower end of movable part 26. The position in the Z direction of application needle holder fixing part 25 therefore also changes with the change in position in the Z direction of bearing 28 and the like by the rotation of cam 29. Furthermore, the positions in the Z direction of application needle holder housing 24, application needle holder 23, and application needle 1 fixed to application needle holder fixing part 25 also change.

Movable part 26 is fixed to one end of a spring 34 (an upper end in the Z direction) through a fixing pin 30A. As shown in a region on the Y-direction positive side in FIG. 2, a base plate 31 is arranged so as to be hidden behind the members shown in FIG. 1. This base plate 31 is fixed to the other end (a lower end in the Z direction) on the opposite side to the one end of spring 34, through a fixing pin 30B. Because of such a configuration, vibration due to rattling of bearing 28 does not occur at movable part 26 at a time of actuation. Preload may be applied to bearing 28 to eliminate rattling, and in this case, spring 34 is not necessarily provided. The tension of spring 34 can be adjusted by a tension adjuster 35.

Base plate 31 holds liquid material container 11 and a not-shown linear guide. The linear guide held by base plate 31 guides the movement of the movable part along the Z direction. On the linear guide, a linear guide movable part 33 is attached for restricting movement of the movable part along a direction other than the extending direction described above. Application needle holder housing 24 and application needle holder fixing part 25 are fixed to linear guide movable part 33 and are movable in synchronization with the movement along the Z direction of linear guide movable part 33. A linear guide 32 is attached to movable part 26. Linear guide 32 supports movable part 26 having application needle holder 23 fixed thereto such that movable part 26 can move up and down.

Base plate 31 has a flat plate shape extending lengthwise in the Z direction and includes a container holding portion 36 at its lower portion in the Z direction. Container holding portion 36 removably holds liquid material container 11. Container holding portion 36 includes, for example, a not-shown magnet and holds liquid material container 11 by magnetic force produced by the magnet. In a different point of view, liquid material container 11 includes, for example, a not-shown magnet and is removably held on container holding portion 36 by magnetic force produced between the magnet and the magnet of container holding portion 36.

Application needle 1 moves in the up-down direction with respect to the Z direction. Application needle 1, application needle holder 23, application needle holder housing 24, application needle holder fixing part 25, and movable part 26 are connected to linear guide movable part 33. Application needle 1 and the like therefore can be collectively referred to as a first vertical drive mechanism. The members that constitute the first vertical drive mechanism are connected to each other, whereby these members can be driven along the vertical direction, that is, the Z direction. On the other hand, liquid material container 11 and container holding portion 36 holding this, and base plate 31 including container holding portion 36 can be collectively referred to as a second vertical drive mechanism different from the first vertical drive mechanism. The members that constitute the second vertical drive mechanism are connected to each other, whereby these members can be driven along the vertical direction. As described above, application needle 1 connected to the first vertical drive mechanism can be moved relative to liquid material container 11 connected to the second vertical drive mechanism with respect to the Z direction.

In the following description, the whole of the liquid application unit shown in FIG. 1 and FIG. 2, including servo motor 20, application needle holder housing 24, application needle holder fixing part 25, and the like is denoted as liquid application unit 39.

<Configuration of Liquid Material Application Apparatus>

Figure 3:
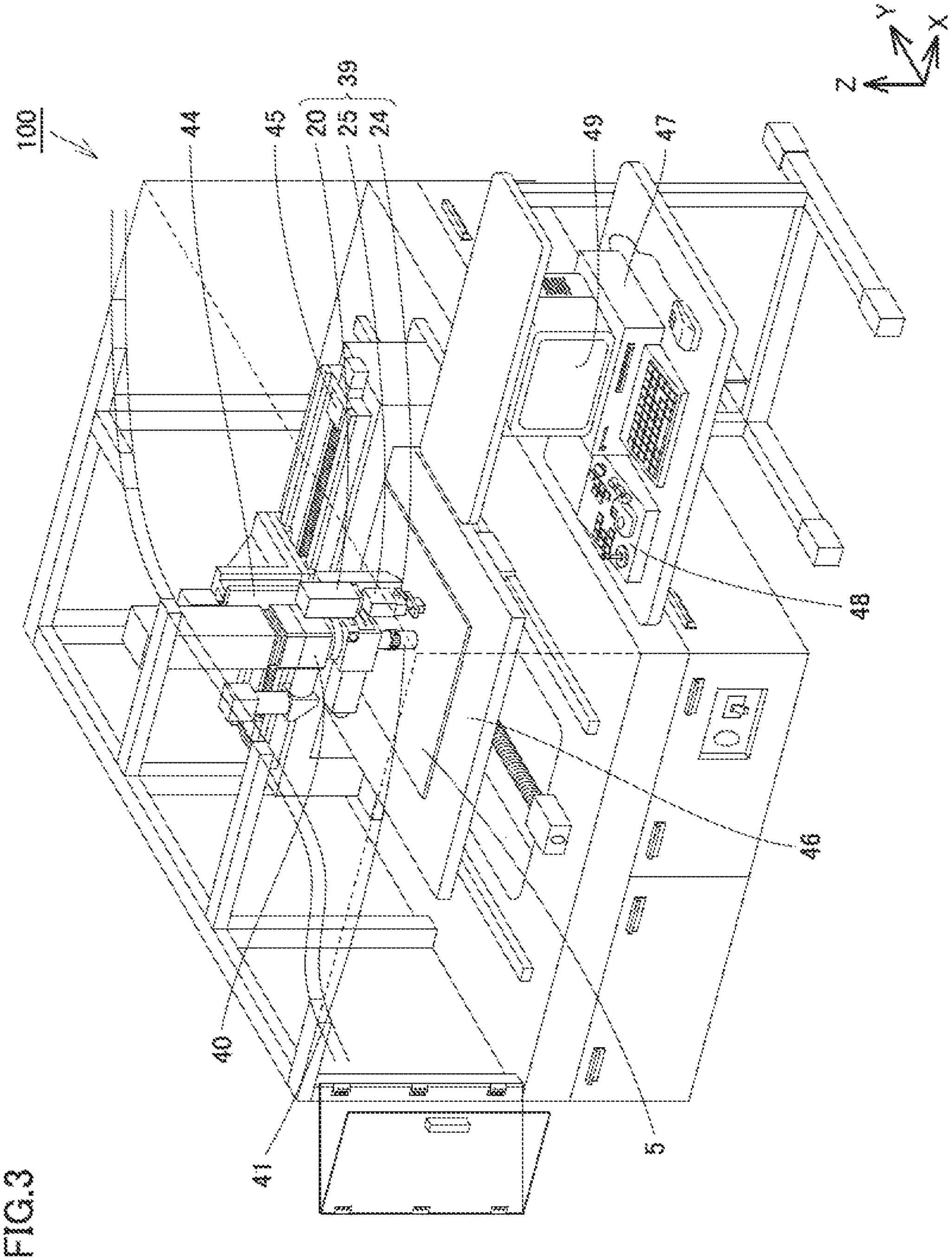
FIG. 3 is a perspective view showing an overall configuration of a liquid material application apparatus according to an embodiment of the present invention, equipped with the liquid application unit shown in FIG. 1.

FIG. 3 is a perspective view showing an overall configuration of a liquid material application apparatus according to an embodiment of the present invention, equipped with the liquid application unit shown in FIG. 1. Referring to FIG. 3, liquid material application apparatus 100 in the present embodiment mainly includes an observation optical system 40, a CCD camera 41, and liquid application unit 39. Observation optical system 40 includes a light source for illumination, an objective lens, and the like and is used for observing a surface state of a substrate 5 that is a target and a state of liquid material 21 (see FIG. 1) applied by liquid application unit 39. An image observed by observation optical system 40 is converted into an electrical signal by CCD camera 41. Liquid application unit 39 applies conductive liquid material 21 (see FIG. 1), for example, to a disconnected portion in a wiring pattern formed on substrate 5 to correct the disconnected portion. In this case, observation optical system 40, CCD camera 41, and liquid application unit 39 constitute a correction head. Furthermore, liquid material application apparatus 100 may apply liquid material 21 (see FIG. 1), for example, to a surface of substrate 5 to form a predetermined pattern.

Liquid material application apparatus 100 further includes a Z-axis table 44 that moves the correction head in the vertical direction (Z-axis direction) relative to the application target substrate 5, an X-axis table 45 having Z-axis table 44 mounted thereon to move the Z-axis table 44 in the lateral direction (X-axis direction), a Y-axis table 46 having substrate 5 mounted thereon to move the substrate 5 in the front-back direction (Y-axis direction) and serving as a stage to hold substrate 5 that is a target, a control computer 47 that controls the operation of the entire apparatus, a monitor 49 to display an image captured by CCD camera 41, and an operation panel 48 for inputting an instruction from the operator to control computer 47. Z-axis table 44, X-axis table 45, and Y-axis table 46 constitute a positioning device.

This apparatus configuration is illustrated by way of example, and, for example, a gantry system may be employed in which Z-axis table 44 having observation optical system 40 and the like mounted thereon is mounted on the X-axis table, the X-axis table is further mounted on the Y-axis table, and Z-axis table 44 is moved in the XY direction. The apparatus configuration may be any configuration that can move Z-axis table 44 having observation optical system 40 and the like mounted thereon, relative to the application target substrate 5 in the XY direction.

<Configuration of Liquid Material Container>

Figure 4:
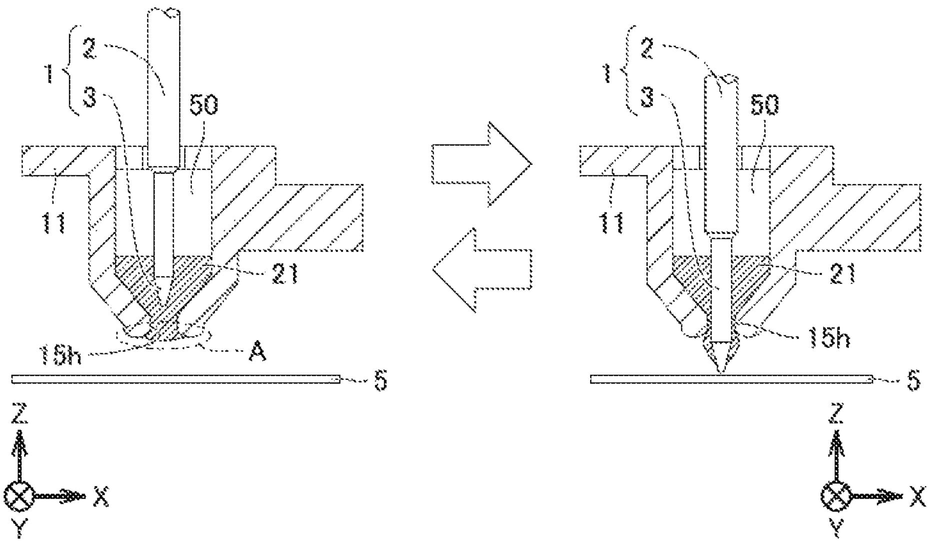
FIG. 4 is a cross-sectional view schematically showing a configuration of a part of a liquid material container included in the liquid application apparatus according to the first embodiment, and a liquid material application method.

FIG. 4 is a cross-sectional view schematically showing a configuration of a part of the liquid material container included in the liquid application apparatus according to the first embodiment, and a liquid material application method. In FIG. 4, liquid material container 11 and a part of application needle 1 arranged in its inside are specifically shown, and the other part is not shown. The shape of the part in FIG. 4 is collectively illustrated as a characteristic shape of the embodiments described below and may be sometimes different from the actual characteristic shape of the invention of the subject application.

The left diagram in FIG. 4 shows a state in which application needle 1 is elevated by change in position in the Z direction of application needle 1 described above. The right diagram in FIG. 4 shows a state in which application needle 1 is lowered by change in position in the Z direction of application needle 1 described above. Referring to FIG. 4, a space 50 for storing liquid material 21 is formed in the interior of liquid material container 11 according to the present embodiment. Furthermore, a hole **15*h* connecting the lower end of the space 50 to the outside is formed at the bottom, that is, the lowermost portion in the Z direction of liquid material container 11. Hole 15*h* allows application needle 1 to pass through space 50. It is therefore preferable that another hole is formed in liquid material container 11 at a position two-dimensionally overlapping with hole 15*h*, and application needle 1 is arranged so as to penetrate through hole 15*h*** and another hole.

Application needle 1 includes a holding portion 2 and a tip end 3. Application needle 1 extends along the Z direction. Holding portion 2 is a member that holds tip end 3 on its lower side in the Z direction. In other words, tip end 3 is a portion that applies liquid material 21 to a target such as a substrate. Holding portion 2 is a portion arranged closer to the base side than tip end 3, that is, on the upper side in the Z direction. It is preferable that holding portion 2 has a larger dimension (thickness) in the width direction than tip end 3. For example, as shown in FIG. 4, in one aspect, application needle 1 may have tip end 3 partially immersed in liquid material 21 in space 50 in liquid material container 11.

Figure 5:
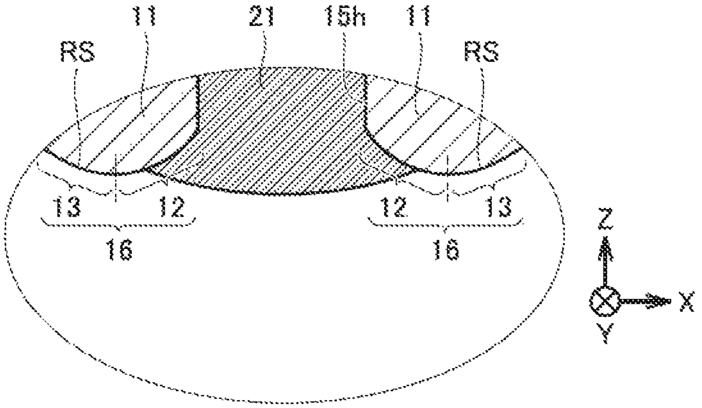
FIG. 5 is an enlarged cross-sectional view schematically showing region A surrounded by the dotted line in FIG. 4 according to a first example of the first embodiment.

FIG. 5 is an enlarged cross-sectional view schematically showing region A surrounded by the dotted line in FIG. 4 according to a first example of the first embodiment. Referring to FIG. 5, a wetting and spreading suppressing structure for liquid material 21 is arranged on the periphery of hole 15*h* in liquid material container 11. As used herein, hole 15*h* refers to a region extending along the vertical direction (the Z direction), in which, as shown in FIG. 4, the lower portion in the Z direction of an inner wall surface that accommodates liquid material 21 in the interior of liquid material container 11 has a smaller width in the X direction (the Y direction) than the width of the upper portion. As used herein, the periphery of hole 15*h* refers to a region of the body of liquid material container 11 that is arranged at the same Z-direction coordinate position as the Z-direction lowermost portion of hole 15*h* and the coordinate position therebelow in the Z direction.

Specifically, in FIG. 5, the wetting and spreading suppressing structure is formed as a protruding portion 16 at the periphery of hole 15*h* based on the definition above. In protruding portion 16, liquid material container 11 has a shape protruding toward the tip end 3 side of application needle 1. As used herein, the tip end 3 side means the lower side in the Z direction, irrespective of the position of tip end 3. Therefore, for example, even when application needle 1 elevates to the upper side in the Z direction as described later and tip end 3 is arranged on the upper side in the Z direction relative to protruding portion 16, protruding portion 16 is curved so as to project toward the tip end 3 side of application needle 1, that is, the lower side in the Z direction. Similarly, as used herein, the holding portion 2 side means the upper side in the Z direction, irrespective of its position.

In the first example of the first embodiment in FIG. 5, in a cross section along hole 15*h*, protruding portion 16 includes a first shape portion 12 and a second shape portion 13. First shape portion 12 has a shape in which a protruding portion surface that is a surface of protruding portion 16 in the cross section is inclined such that the width of hole 15*h* is larger on the lower side in the Z direction of application needle 1 than on the upper side in the Z direction. That is, a region inside of first shape portion 12 is hole 15*h*. Second shape portion 13 has a shape in which the protruding portion surface is inclined on the outside of hole 15*h* such that the width of protruding portion 16 increases from the lower side toward the upper side in the Z direction. As used herein, the width means a dimension in the X direction in FIG. 4 and FIG. 5.

First shape portion 12 forms the lowermost portion of hole 15*h*. First shape portion 12 is therefore arranged on the hole 15*h* side in the X direction, that is, on the inside of liquid material container 11. Second shape portion 13 is arranged on the opposite side to the hole 15*h* in the X direction, that is, on the outside of liquid material container 11.

In other words, in FIG. 5, first shape portion 12 forms a flared shape such that hole 15*h* becomes wider downward on the inside in the X direction of liquid material container 11. Second shape portion 13 has an inclined shape such that the width of a portion of liquid material container 11 becomes larger upward on the outside in the X direction of liquid material container 11. First shape portion 12 and second shape portion 13 are arranged to as to be generally aligned in the X direction.

In the cross section shown in FIG. 5, at least one of first shape portion 12 and second shape portion 13 is arc-shaped. That is, the protruding portion surface of at least one of first shape portion 12 and second shape portion 13 has an arc-like shape. In FIG. 5, both of first shape portion 12 and second shape portion 13 are arc-shaped surfaces RS as arc-shaped protruding portion surfaces. That is, first shape portion 12 and second shape portion 13 are arc-shaped curves.

Figure 6:
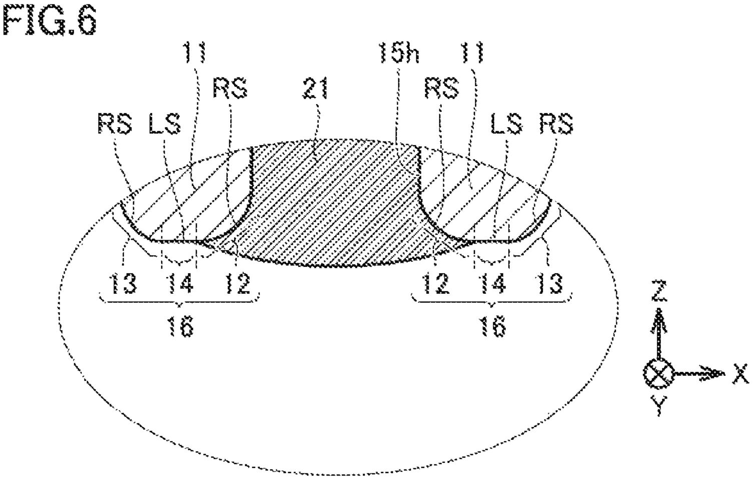
FIG. 6 is an enlarged cross-sectional view schematically showing region A surrounded by the dotted line in FIG. 4 according to a second example of the first embodiment.

FIG. 6 is an enlarged cross-sectional view schematically showing region A surrounded by the dotted line in FIG. 4 according to a second example of the first embodiment. Referring to FIG. 6, protruding portion 16 in the second example of first embodiment further includes a connection portion 14 connecting first shape portion 12 and second shape portion 13. Connection portion 14 is arranged between first shape portion 12 and second shape portion 13 specifically in the X direction.

Connection portion 14 is preferably a flat surface along the XY plane. That is, in the cross section in FIG. 6, connection portion 14 is preferably a linear surface along the X direction. Even when connection portion 14 is a flat surface, the whole including this portion as well as first shape portion 12 and second shape portion 13 is defined as protruding portion 16. In the cross section shown in FIG. 6, therefore, in the protruding portion surface that forms protruding portion 16, first shape portion 12 and second shape portion 13 are arc-shaped surfaces RS, whereas connection portion 14 is a linear surface LS.

The X direction in FIG. 6 is a radial direction from the center in a two-dimensional view of application needle 1. This radial direction is a direction extending radially from the center in a two-dimensional view of application needle 1, including the X direction and the Y direction. In the present embodiment in which the wetting and spreading suppressing structure is formed as protruding portion 16, it is preferable that connection portion 14 has a dimension equal to or less than 50 μm in the radial direction in a two-dimensional view from the center of application needle 1. This connection portion 14 is more preferably equal to or less than 30 μm, further more preferably equal to or less than 20 μm.

Figure 7:
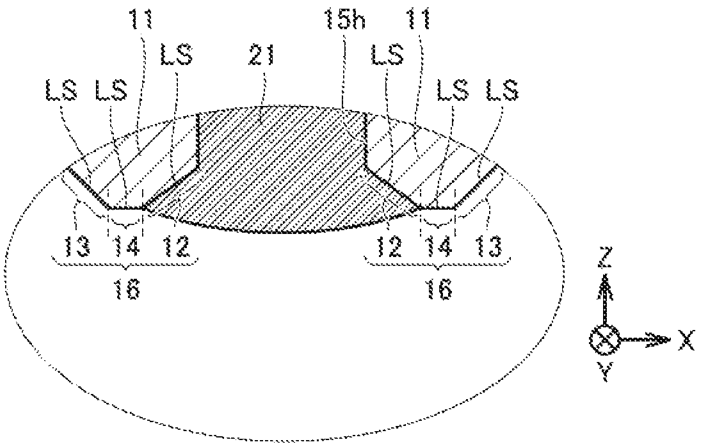
FIG. 7 is an enlarged cross-sectional view schematically showing region A surrounded by the dotted line in FIG. 4 according to a third example of the first embodiment.

FIG. 7 is an enlarged cross-sectional view schematically showing region A surrounded by the dotted line in FIG. 4 according to a third example of the first embodiment. Referring to FIG. 7, in protruding portion 16 in the third example of the first embodiment in the cross section shown in FIG. 7, at least one of first shape portion 12 and second shape portion 13 is linear. That is, the protruding portion surface of at least one of first shape portion 12 and second shape portion 13 has a linear shape. In FIG. 7, both of first shape portion 12 and second shape portion 13 are linear surfaces LS as linear protruding portion surfaces. That is, first shape portion 12 and second shape portion 13 are straight lines extending in an inclined direction relative to all of the X direction, the Y direction, and the Z direction in the cross section shown in FIG. 7. For example, first shape portion 12 and second shape portion 13 may be linear surfaces LS extending in a direction inclined by approximately 45° relative to the X direction and the Z direction. That is, first shape portion 12 and second shape portion 13 may have a chamfered (C) surface shape.

In the third example in FIG. 7, similarly to the second example in FIG. 6, connection portion 14 is formed as linear surface LS between first shape portion 12 and second shape portion 13.

In the present embodiment, it is preferable that second shape portion 13 has a steeper slope than first shape portion 12 with respect to the extending direction of hole 15*h*, that is, the Z direction. That is, in FIG. 5 and FIG. 6, the angle formed by a tangent at a point at a certain Z coordinate in arc-shaped surface RS of second shape portion 13 with the Z direction is smaller than the angle formed by a tangent at a point at the same Z coordinate as the certain Z coordinate of first shape portion 12 with the Z direction. In FIG. 7, it is preferable that the angle formed by linear surface LS of second shape portion 13 with the Z direction is smaller than the angle formed by linear surface LS of first shape portion 12 with the Z direction.

In the present embodiment, at least one of first shape portion 12 and second shape portion 13 may be arc-shaped. Furthermore, at least one of first shape portion 12 and second shape portion may be linear. Therefore, although not shown in the drawings, for example, at least one of first shape portion 12 and second shape portion 13 of liquid material container 11 may be arc-shaped and the other may be linear.

<Liquid Material for Use>

It is preferable that liquid material 21 for use in the present embodiment is a conductive material containing metal fine particles. Specifically, it is preferable that liquid material 21 is, for example, any one selected from the group consisting of solder paste, silver paste, and copper paste. It is preferable that the viscosity of liquid material 21 is typically equal to or higher than 20 Pa·s and equal to or lower than 80 Pa·s. It is preferable that the mean specific gravity of liquid material 21 is typically equal to or more than 5 and equal to or less than 9. However, the viscosity and the mean specific gravity of liquid material 21 widely vary depending on the usage and the printing method.

<Liquid Material Application Method>

Referring to FIG. 4 again, as shown in the left drawing, liquid material 21 is held in space 50 of liquid material container 11. Tip end 3 of application needle 1 is immersed in liquid material 21 in space 50 of liquid material container 11. In this state, tip end 3 is arranged to face substrate 5 that is a target to which liquid material 21 is applied. The left drawing in FIG. 4 shows a step of applying liquid material 21 to tip end 3, as a stage before liquid material 21 is supplied to a surface of substrate 5. The left drawing in FIG. 4 corresponds to a first state in which the tip end of application needle 1 is positioned in space 50 of liquid material container 11.

Referring to the right drawing in FIG. 4, application needle 1 is lowered from the state in the left diagram in FIG. 4 and comes into contact with an application target surface (a main surface on the upper side) of substrate 5. Consequently, application needle 1 having tip end 3 accommodated in liquid material container 11 until then moves downward, compared with the state in the left drawing in FIG. 4. With the lowering of application needle 1, tip end 3 protrudes to the outside of liquid material container 11 through hole 15*h* and comes into contact with the application target surface of substrate 5. Liquid material 21 adhering to tip end 3 is then supplied onto the application target surface of substrate 5. As described above, application needle 1 is lowered to bring tip end 3 into contact with the application target surface. The right diagram in FIG. 4 corresponds to a second state in which the tip end of application needle 1 is positioned outside of liquid material container 11. Once the application step shown by the right diagram in FIG. 4 is finished, application needle 1 elevates again into the state in the left drawing in FIG. 4. In this way, the state on the left side (first state) and the state on the right side (second state) of FIG. 4 can be alternately repeated.

<Operation and Effect>

Figure 8:
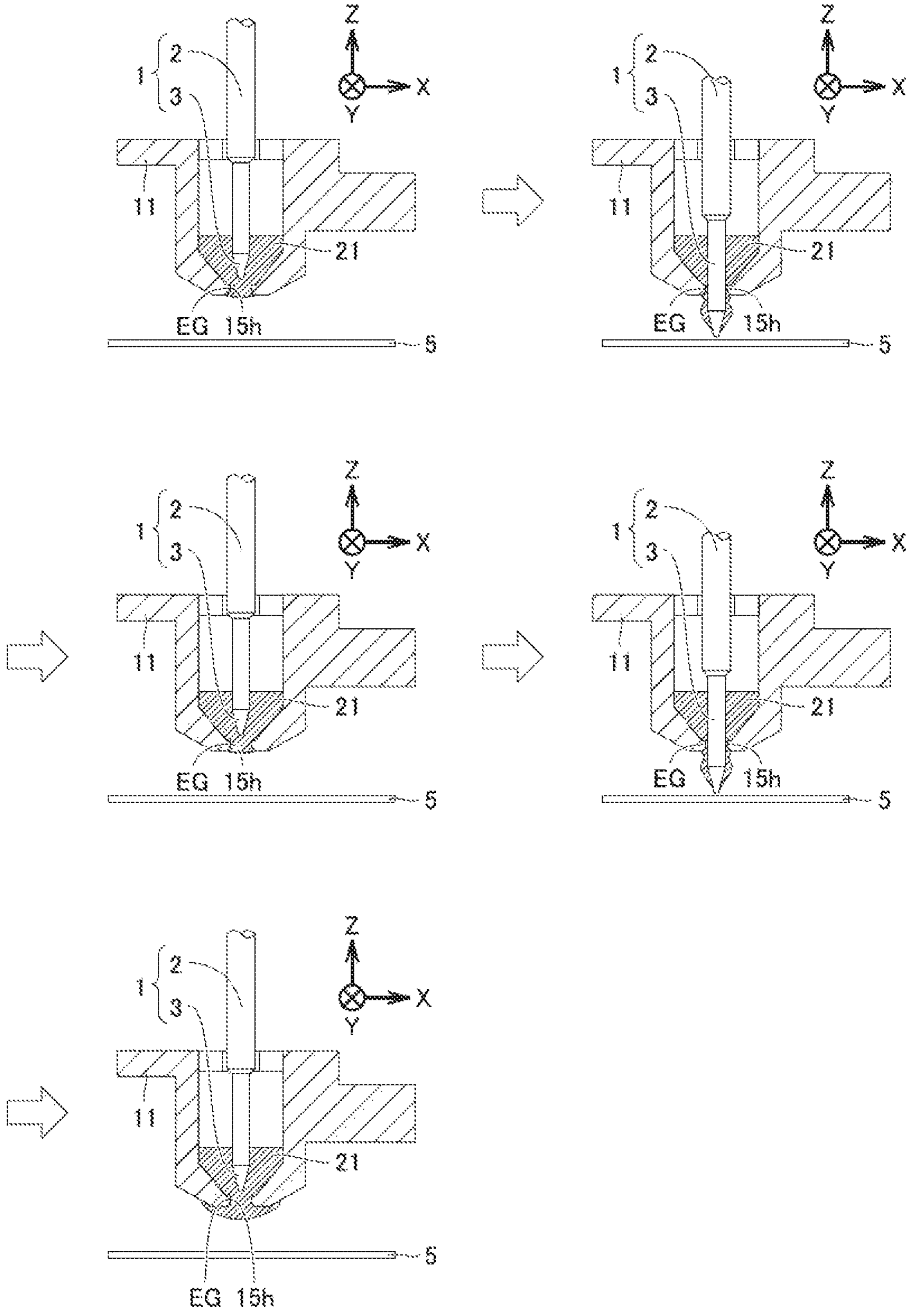
FIG. 8 is a cross-sectional view schematically showing the position of an application needle and change in state of the liquid material container by repeating a liquid material application method in a comparative example.
Figure 9:
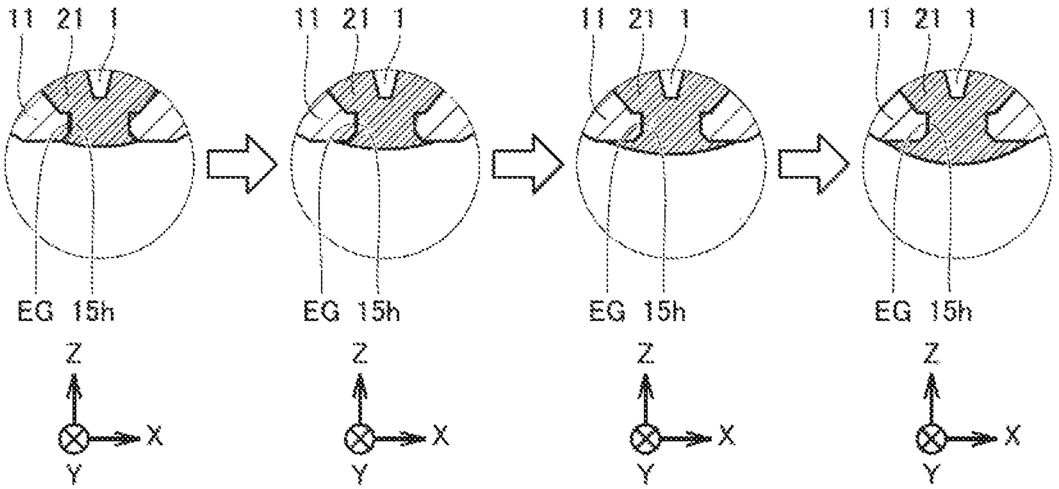
FIG. 9 is a cross-sectional view schematically showing change in state of the liquid material container by repeating the liquid material application method in the comparative example.

The operation and effect of the present embodiment will be described below with reference to a comparative example in FIG. 8 and FIG. 9. FIG. 8 is a cross-sectional view schematically showing the position of the application needle and change in state of the liquid material container by repeating a liquid material application method in a comparative example. FIG. 9 is a cross-sectional view schematically showing change in state of the liquid material container by repeating the liquid material application method in the comparative example. Referring to FIG. 8, the drawings are denoted as first to five drawings in order of time as shown by the arrows. The first drawing, the third drawing, and the fifth drawing correspond to the first state described above in FIG. 4, and the second drawing and the fourth drawing correspond to the second state described above in FIG. 4. By repeating the first state and the second state in FIG. 4, as shown in the fifth drawing in FIG. 8, liquid material 21 adhering to tip end 3 of application needle 1 adheres to immediately below hole 15*h* and to the surface of liquid material container 11 on the periphery of hole 15*h*. Referring to FIG. 9, the first state and the second state in FIG. 4 are further repeated with liquid material 21 thus adhering to immediately below hole 15*h* and to the surface of liquid material container 11. Consequently, liquid material 21 wets and spreads at the lower portion of liquid material container 11 as time passes as shown by the arrows in FIG. 9. This wetting and spreading of liquid material 21 is due to the action of surface tension. More specifically, because of the action of surface tension, liquid material 21 spreading out of the lowermost portion of hole 15*h* accumulates on the periphery of hole 15*h* and wets and spreads when application needle 1 elevates and returns into liquid material container 11.

In this way, the wetting and spreading of the liquid material on the periphery of hole 15*h* of liquid material container 11 causes liquid accumulation. This liquid accumulation changes the amount of liquid material 21 adhering to the tip end of application needle 1. As a result, the amount of application of liquid material 21 to the application target may vary.

One of the reasons why liquid material 21 wets and spreads on the periphery of hole 15*h* is that liquid material container 11 in the comparative example has an edge EG at the lowermost portion. Edge EG is a region in which liquid material container 11 has a curved shape at its lowermost portion so as to extend toward the center side of application needle 1, that is, the inside in a two-dimensional view relative to the other region. Edge EG forms narrow hole 15*h* within the curved shape portion. Liquid material 21 tends to intensively accumulate at the portion where edge EG is formed. This is because hole 15*h* adjacent to edge EG has a width narrower than a region other than hole 15*h* in space 50. Presumably, if liquid material 21 intensively accumulates at hole 15*h*, liquid material 21 leaking out therefrom is likely to wet and spread on a surface portion of liquid material container 11 on the periphery.

Another possible reason why liquid material 21 wets and spreads on the periphery of hole 15*h* is that the viscosity and the specific gravity of liquid material 21 are large. If the viscosity and the specific gravity of liquid material 21 are large, liquid material 21 leaking out from hole 15*h* with protrusion of tip end 3 fails to return to space 50 of liquid material container 11 as a result of repeating application fast multiple times. Consequently, liquid material 21 gradually wets and spreads on the periphery of hole 15*h*. Furthermore, with variations in surface properties of the periphery of hole 15*h*, the degree of wetting and spreading of liquid material 21 to hole 15*h* becomes uneven. This is also the cause of variation in the amount of application of liquid material 21.

Then, in liquid application unit 39 in the present embodiment, the wetting and spreading suppressing structure for liquid material 21 is arranged on the periphery of hole 15*h* in liquid material container 11. With this structure, the wetting and spreading of liquid material 21 to the outside of liquid material container 11 is suppressed, and then, variation in the amount of application of liquid material 21 to the application target is suppressed. As a result, the amount of application is stabilized so that a liquid material having a high viscosity can be applied stably for a long time.

In liquid application unit 39 in the present embodiment, in a cross section along hole 15*h*, protruding portion 16 includes first shape portion 12 having a shape in which the protruding portion surface that is a surface of protruding portion 16 is inclined such that the width of hole 15*h* is larger on the tip end 3 side than on the holding portion 2 side. Protruding portion 16 includes second shape portion 13 having a shape in which the protruding portion surface is inclined on the outside of hole 15*h* such that its width increases from the tip end 3 side toward the holding portion 2 side. With first shape portion 12, hole 15*h* has a portion having a width increasing downward at its lowermost portion. This width-increasing portion is a structure that makes it easier for liquid material 21 protruding from hole 15*h* at the time of lowering of application needle 1 to return to the interior of hole 15*h* at the time of subsequent elevation of application needle 1. This is because first shape portion 12 has a shape that increases the width of hole 15*h*, contrary to the surface portion on the hole 15*h* side of edge EG, and therefore suppresses concentration and accumulation of liquid material 21 in hole 15*h*. With this configuration, liquid material 21 temporarily discharged to the outside of hole 15*h* is returned to the inside of liquid material container 11, thereby suppressing wetting and spreading on the outside of liquid material container 11. Even if liquid material 21 protruding to the outside of liquid material container 11 wets and spreads to reach second shape portion 13, liquid material 21 need to climb on second shape portion 13 to wet and spread on second shape portion 13. Liquid material 21 reaching second shape portion 13 is inevitably subjected to the action of gravity, and therefore, it is difficult to climb on second shape portion 13. Thus, because of the provision of second shape portion 13, wetting and spreading of liquid material 21 to the outside of liquid material container 11 is suppressed.

In other words, the present embodiment provides a wetting and spreading suppressing structure that does not have edge EG but has a shape having first shape portion 12 and the like. With this structure, liquid material 21 leaking out from hole 15*h* of liquid material container 11 together with tip end 3 of application needle 1 can smoothly return into liquid material container 11 together with tip end 3 of application needle 1. Therefore, unlike the comparative example, the phenomenon in which liquid material 21 accumulates at the lowermost portion of liquid material container 11 is suppressed. Accordingly, variation in the amount of application by application needle 1 can be reduced. The reduction of variation in the amount of application by application needle 1 according to the present embodiment is advantageous over reduction of variation in the amount of application by surface treatment such as liquid-repellent coating, in view of manufacturing and quality. This is because the present embodiment does not include a chemical treatment process in surface treatment such as a liquid-repellent coating and can eliminate the possibility that liquid material 21 drops off from hole 15*h*.

In liquid application unit 39 in the present embodiment, protruding portion 16 may further include connection portion 14 connecting first shape portion 12 and second shape portion 13. Connection portion 14 is a portion that remains as a flat portion during processing of first shape portion 12 and second shape portion 13, in a cross section along hole 15*h*. Even when connection portion 14 is formed to some degree depending on the processing condition and the like, there is no harm to the operation effect of the present embodiment achieved by protruding portion 16 having first shape portion 12 and second shape portion 13. However, in light of maintaining the operation effect, it is preferable that connection portion 14 has a dimension equal to or less than 50 μm in the radial direction from the center of application needle 1.

In liquid application unit 39 in the present embodiment, at least one of first shape portion 12 and second shape portion 13 is arc-shaped. For example, first shape portion 12 is formed into an arc-like shape, that is, a rounded (R) shape so that liquid material 21 leaking out from hole 15*h* of liquid material container 11 together with tip end 3 of application needle 1 can smoothly return into liquid material container 11 together with tip end 3 of application needle 1. As a result, liquid material 21 is held at a certain position where the surface tension and the gravity are in balance on first shape portion 12 as arc-shaped surface RS. Therefore, unlike the comparative example, the phenomenon in which liquid material 21 accumulates at the lowermost portion of liquid material container 11 is suppressed. When second shape portion 13 is arc-shaped, the action of pulling back liquid material 21 reaching second shape portion 13 quickly to the hole 15*h* side can be enhanced. However, even when at least one of first shape portion 12 and second shape portion 13 is linear, the action of pulling back liquid material 21 to the interior of liquid material container 11 can be achieved as described above.

In liquid application unit 39 in the present embodiment, it is preferable that second shape portion 13 has a steeper slope than first shape portion 12 with respect to the extending direction of hole 15*h*. With this configuration, the climbing of the leaking liquid material 21 on second shape portion 13 can be suppressed more reliably. This enhances the effect of pulling back liquid material 21 reaching second shape portion 13 to the interior of liquid material container 11.

Second Embodiment

Figure 10:
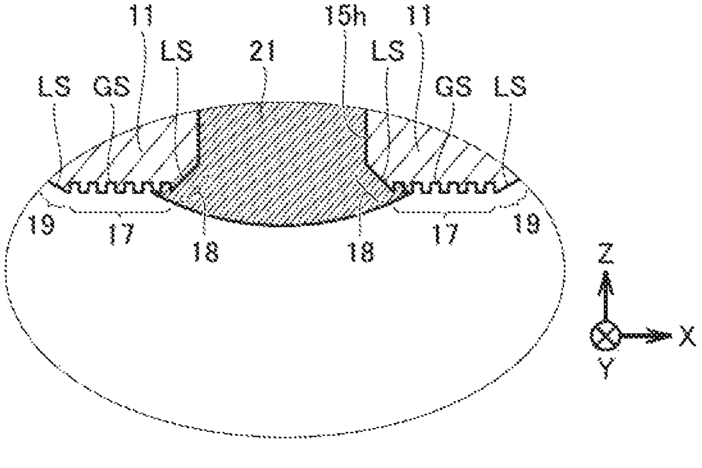
FIG. 10 is an enlarged cross-sectional view schematically showing region A surrounded by the dotted line in FIG. 4 according to a first example of a second embodiment.
Figure 11:
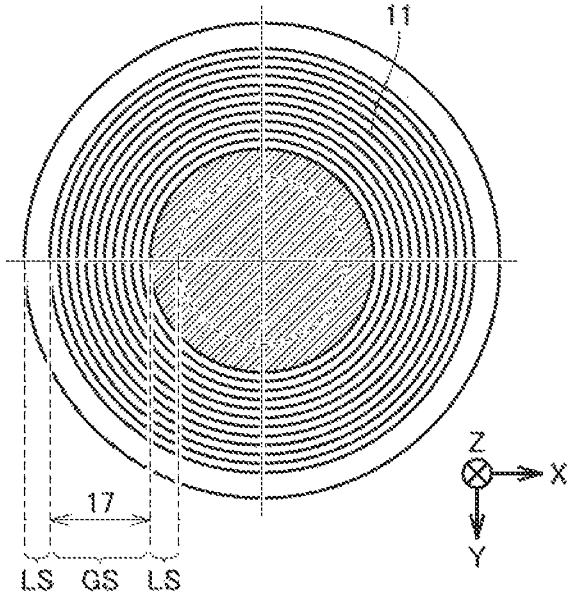
FIG. 11 is an enlarged plan view schematically showing a manner of a region shown in FIG. 10 as two-dimensionally viewed from the lower side in the Z direction.

FIG. 10 is an enlarged cross-sectional view schematically showing region A surrounded by the dotted line in FIG. 4 according to a first example of a second embodiment. FIG. 11 is an enlarged plan view schematically showing a manner in which the region shown in FIG. 10 is two-dimensionally viewed from the lower side in the Z direction. Referring to FIG. 10 and FIG. 11, a wetting and spreading suppressing structure for liquid material 21 is arranged on the periphery of hole 15*h* in liquid material container 11 according to the first example of the present embodiment, Specifically, in FIG. 10 and FIG. 11, the wetting and spreading suppressing structure is annular grooves 17. A plurality of annular grooves 17 are spaced apart from each other in the radial direction in a two-dimensional view from the center of application needle 1. In the annular grooves 17, a plurality of depressions depressed in the Z direction and a plurality of projections protruding in the Z direction are alternately arranged in the radial direction to form a configuration including the depressions and the projections spaced apart from each other in the radial direction. In this way, in the present embodiment, a surface of regions that sandwich hole 15*h* of liquid material container 11 therebetween forms a grooved surface GS in which a plurality of depressions and a plurality of projections are arranged. Grooved surface GS extends concentrically in a two-dimensional view to form annular grooves 17.

In FIG. 10 and FIG. 11, grooved surface GS is formed on a surface along the X direction in a cross section along hole 15*h* shown in FIG. 10. The surface is formed at the central portion in the X direction, and linear surfaces LS are formed on the left side and the right side in the X direction such that this surface is sandwiched therebetween. Linear surface LS is formed on the hole 15*h* side of annular grooves 17, that is, on the inside in the X direction in a two-dimensional view, in a cross section along hole 15*h* shown in FIG. 10. Linear surface LS is a third shape portion 18 in which the surface of liquid material container 11 has an inclined shape such that the width of hole 15*h* is larger on the lower side in the Z direction than on the upper side.

In FIG. 10, linear surface LS is also formed as a fourth shape portion 19, in addition to the above-noted third shape portion 18. Linear surface LS serving as fourth shape portion 19 is formed on the opposite side to hole 15*h* of annular grooves 17, that is, on the outside in the X direction, in a cross section along hole 15*h* shown in FIG. 10. Linear surface LS serving as fourth shape portion 19 has an inclined shape on the outside of hole 15*h* such that the width of the body of liquid material container 11 increases from the lower side in the Z direction toward the upper side.

In FIG. 10, therefore, third shape portion 18 has a manner similar to first shape portion 12 in the first embodiment, and fourth shape portion 19 has a manner similar to second shape portion 13 in the first embodiment. In other words, the body of liquid material container 11 has a shape like protruding portion 16 in the first embodiment. In this way, the present embodiment may also have a shape similar to protruding portion 16 in the first embodiment. However, in FIG. 10, the dimension in the radial direction from the center of application needle 1 of the region of annular grooves 17 having grooved surface GS corresponding to connection portion 14 in the first embodiment may exceed 50 μm. Furthermore, the difference in height with respect to the Z direction between the depression and the projection of grooved surface GS is preferably equal to or more than 50 μm, more preferably equal to or more than 100 μm. The difference in height is further preferably equal to or more than 200 μm. The dimensions and shape of grooved surface GS, including the difference in height between the depression and the projection, will be theoretically described later.

Figure 12:
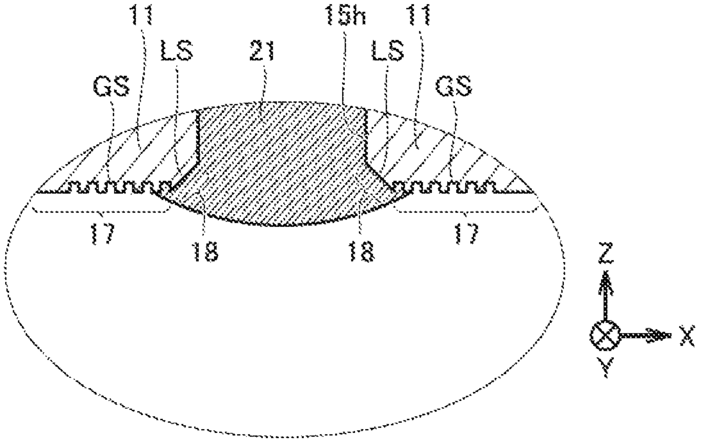
FIG. 12 is an enlarged cross-sectional view schematically showing region A surrounded by the dotted line in FIG. 4 according to a second example of the second embodiment.
Figure 13:
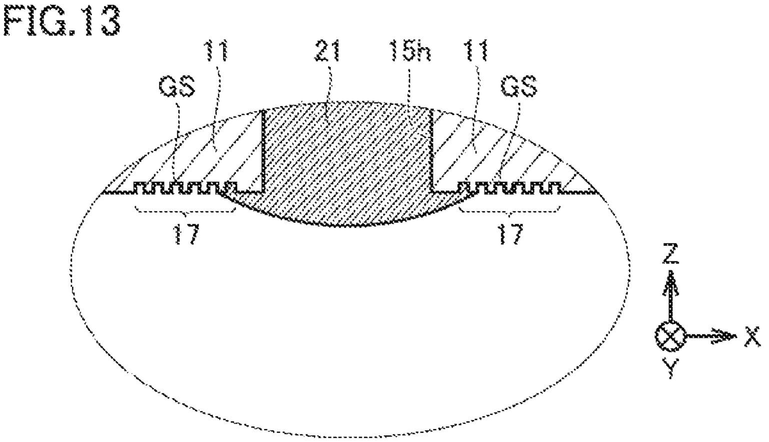
FIG. 13 is an enlarged cross-sectional view schematically showing region A surrounded by the dotted line in FIG. 4 according to a third example of the second embodiment.

The region having linear surfaces LS in FIG. 10 described above has linear surfaces LS inclined to the X direction and the Z direction, for example, such that a chamfered surface shape is formed on the hole 15*h* side and the opposite side to hole 15*h* of annular grooves 17. However, in the present embodiment, only the linear surface LS serving as third shape portion 18 at least on the hole 15*h* side may be formed as in the following second example. Alternatively, in the present embodiment, either of linear surfaces LS serving as third shape portion 18 and fourth shape portion 19 is not provided, and only the annular grooves 17 having grooved surface GS may be formed at the flat lowermost surface, as in the following third example. FIG. 12 is an enlarged cross-sectional view schematically showing region A surrounded by the dotted line in FIG. 4 according to the second example of the second embodiment. FIG. 13 is an enlarged cross-sectional view schematically showing region A surrounded by the dotted line in FIG. 4 according to the third example of the second embodiment. Referring to FIG. 12, the second example of the present embodiment differs from the first example in that, for example, the chambered surface-shaped portion that is linear surface LS serving as fourth shape portion 19 is not formed. Referring to FIG. 13, the third example of the present embodiment differs from the second example in that, for example, the chambered surface-shaped portion that is linear surface LS serving as third shape portion 18 is not formed.

<Operation and Effect>

In liquid application unit 39 in the present embodiment, the wetting and spreading suppressing structure is a plurality of annular grooves 17 spaced apart from each other in the radial direction from the center of application needle 1. Because of such a configuration, the angle of contact between liquid material 21 and the surface of the lowermost portion of liquid material container 11 on the periphery of hole 15*h*, that is, grooved surface GS having annular grooves 17 is large. The liquid repellency of grooved surface GS is thus enhanced. Therefore, for example, unlike the comparative example in FIG. 8 and FIG. 9, the inconvenience of wetting and spreading of liquid material 21 leaking out from hole 15*h* of liquid material container 11 to the surface of liquid material container 11 can be suppressed. The present embodiment therefore also can suppress variation in the amount of application of liquid material 21 to an application target, similarly to the first embodiment. As a result, the amount of application is stabilized so that a liquid material having a high viscosity can be applied stably for a long time.

Liquid application unit 39 in the present embodiment includes third shape portion 18 having a shape in which the surface of liquid material container 11 is inclined such that the width of hole 15*h* is larger on the tip end 3 side than on the holding portion 2 side, on the hole 15*h* side of annular grooves 17, in a cross section along hole 15*h*. In a cross section along hole 15*h*, for example, shown in FIG. 10, this third shape portion 18 is linear. The wettability of liquid material 21 is higher on such linear surface LS serving as third shape portion 18 than in the other region on the periphery. In other words, third shape portion 18 has a smaller angle of contact for liquid material 21 to wet than the other region on the periphery. Therefore, liquid material 21 that attempts to leak out from hole 15*h* is guided to be held on third shape portion 18 formed at the lowermost portion of hole 15*h*. This suppresses a phenomenon in which liquid material 21 is held disproportionately at a part of the surface of the lowermost portion of liquid material container 11 due to variation in liquid repellency at the portion of annular grooves 17 and axial misalignment between application needle 1 and hole 15*h*. Accordingly, variation in the amount of application of liquid material 21 to an application target can be suppressed.

The present embodiment is also advantageous over reduction of variation in the amount of application by surface treatment such as a liquid-repellent coating, in view of manufacturing and quality, similarly to the first embodiment.

<Theory>

Patterns of liquid repellency achieved by the depressions and projections of grooved surface GS of annular grooves 17 in the present embodiment include two kinds, namely, a pattern on the Cassie-Baxter theory and a pattern on the Wenzel theory. First, in the pattern on the Cassie-Baxter theory, liquid material 21 is unable to reach the bottom of the depression of grooved surface GS. A liquid droplet of liquid material 21 is therefore in a composite contact state in which it is in contact with both of the projection and the air in the depression. In this state, the area in which liquid material 21 is in contact with the air having the highest liquid phobicity increases, resulting in high liquid repellency. On the other hand, in the pattern on the Wenzel theory, liquid material 21 intrudes into the bottom of the depression of grooved surface GS. A liquid droplet of liquid material 21 is thus in contact with the liquid droplet and the surface of substrate 5 (see FIG. 1) rather than in the composite contact state as described above. In this state, the area in which liquid material 21 is in contact with the liquid droplet and the surface of substrate 5 increases. Accordingly, interface free energy at the interface of the liquid droplet with the surface of substrate 5 increases, and the wettability of substrate 5 is enhanced. Therefore, when liquid material container 11 is formed of a material with high liquid repellency, the liquid repellency of liquid material container 11 can be further increased. Specifically, it is preferable that liquid material container 11 in the present embodiment is formed of a material with high liquid repellency, such as resin or stainless steel. It is noted that the preferred materials of liquid material container 11 described above are applicable to the first embodiment.

In the pattern on the Cassie-Baxter theory, the angle of contact is large and liquid repellency is improved. However, since the contact area between the liquid droplet and the surface of substrate 5 is small, the adsorption force at the interface between the liquid droplet and substrate 5 is small. In the pattern on the Cassie-Baxter theory, therefore, the adsorption force of liquid material 21 at a surface of tip end 3 of application needle 1 is weak. Therefore, due to the inertial force when application needle 1 protrudes from hole 15*h*, the amount of application of liquid material 21 to substrate 5 may increase drastically or a large liquid accumulation may be formed.

On the other hand, in the pattern on the Wenzel theory, the contact area between the liquid droplet and the surface of substrate 5 increases, and the adsorption force at the interface between the liquid droplet and substrate 5 is large. This is effective in stabilizing the amount of application to substrate 5 when application needle 1 protrudes from hole 15*h* and in suppressing formation of liquid accumulation. It is therefore preferable to design parameters such as groove shape, groove width, and groove depth so that the pattern on the Wenzel theory is developed, considering the properties of liquid material 21.

<Modifications>

As shown in FIG. 11, in the present embodiment, grooved surface GS has a concentric shape. More specifically, the depressions and the projections of grooved surface GS are formed so as to extend, for example, in a direction (circumferential direction) intersecting (orthogonal to) the direction in which liquid material 21 wets and spreads on the surface of liquid material container 11. This configuration provides the pinning effect that increases the contact angle of liquid material 21 on the surface of liquid material container 11 at an edge portion (an edge at the entrance of the depression, an edge of the uppermost portion of the projection, etc.) in a cross section of the depressions and the projections, in addition to the effect of improving liquid repellency as described above. Accordingly, the liquid repellency is further improved at the edge portion.

In FIG. 11, grooved surface GS (annular grooves 17) is formed on the entire circumferential portion in the circumferential direction on the periphery of hole 15*h*. However, the present invention is not limited to such a manner. For example, although not shown in the drawings, grooved surface GS (annular grooves 17) may be formed only partially in the circumferential direction on the periphery of hole 15*h*.

Third Embodiment

Figure 14:
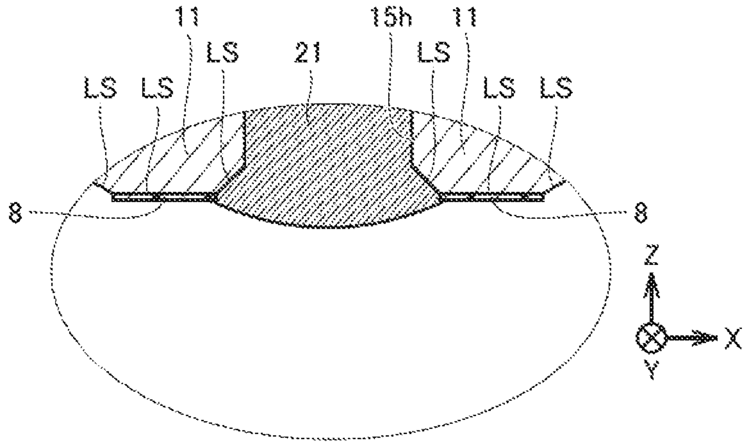
FIG. 14 is an enlarged cross-sectional view schematically showing region A surrounded by the dotted line in FIG. 4 according to a third embodiment.

FIG. 14 is an enlarged cross-sectional view schematically showing region A surrounded by the dotted line in FIG. 4 according to a third embodiment. Referring to FIG. 14, a wetting and spreading suppressing structure for liquid material 21 is arranged on the periphery of hole 15*h* in liquid material container 11 according to the present embodiment Specifically, in FIG. 14, the wetting and spreading suppressing structure is formed as a liquid-repellent coating 8 having liquid repellency Specifically, liquid-repellent coating 8 is a thin film having high liquid repellency to liquid material 21. For example, when liquid material 21 is a conductive material, liquid material 21 contains an organic substance commonly called rosin as a flux it is therefore preferable that a thin film having high oil repellency is formed as liquid-repellent coating 8.

For example, when liquid material container 11 has protruding portion 16 similar to the first embodiment, it is preferable that liquid-repellent coating 8 is formed at least on a surface on the periphery of hole 15*h* at the lowermost portion of protruding portion 16. However, when the process of forming liquid-repellent coating 8 locally in this way is complicated or when there is concern about unevenness of the thickness and the like of the locally formed liquid-repellent coating 8, liquid-repellent coating 8 may be formed on the entire surface of liquid material container 11 including the region described above.

The present embodiment achieves the effect of suppressing wetting and spreading of liquid material 21 by liquid-repellent coating 8, similarly to the first and second embodiments.

The features described in the foregoing embodiments (and the examples included therein) may be combined as appropriate and applied in a technically consistent manner.

Embodiments disclosed here should be understood as being illustrative rather than being limitative in all respects. The scope of the present invention is shown not in the foregoing description but in the claims, and it is intended that all modifications that come within the meaning and range of equivalence to the claims are embraced here.

REFERENCE SIGNS LIST

1 application needle, 2 holding portion, 3 tip end, 5 substrate, 8 liquid-repellent coating, 11 liquid material container, 12 first shape portion, 13 second shape portion, 15*h* hole, 16 protruding portion, 17 annular groove. 20 servo motor, 21 liquid material, 23 application needle holder, 24 application needle holder housing, 25 application needle holder fixing part, 26 movable part, 27 cam coupling plate, 28 bearing. 29 cam, 30A, 30B fixing pin, 31 base plate, 32 linear guide, 33 linear motor movable part, 34 spring, 36 container holding portion, 39 liquid application unit, 40 observation optical system, 41 CCD camera, 44 Z-axis table, 45 X-axis table, 46 Y-axis table, 47 control computer, 48 operation panel, 49 monitor, 50 space, 100 liquid application apparatus, AX rotation axis. EG edge, GS grooved surface, LS linear surface, RS arc-shaped surface.

The invention claimed is:

1. A liquid application unit for applying a liquid material to a surface of a target using an application needle, the liquid application unit comprising:

the application needle; and a liquid material container that stores the liquid material, wherein the liquid material container has a space that stores the liquid material and a hole that allows the application needle to pass through the space, a wetting and spreading suppressing structure for the liquid material is disposed at a periphery of the hole in the liquid material container, the application needle includes a tip end that applies the liquid material to the target and a holding portion disposed closer to a base side than the tip end, the wetting and spreading suppressing structure is a protruding portion in which the liquid material container has a protruding shape toward a tip end side of the application needle, in a cross section along the hole, the protruding portion includes a first shape portion and a second shape portion, the first shape portion having a shape in which a protruding portion surface that is a surface of the protruding portion is inclined such that a width of the hole is larger on the tip end side than on the holding portion side, the second shape portion having a shape in which the protruding portion surface is inclined outside of the hole such that a width of the protruding portion increases from the tip end side toward the holding portion side, and the inclined protruding portion surface in the second shape portion has a steeper slope than the inclined protruding portion surface in the first shape portion with respect to an extending direction of the hole.

2. The liquid application unit according to claim 1, wherein the protruding portion further includes a connection portion connecting the first shape portion and the second shape portion.

3. The liquid application unit according to claim 2, wherein the connection portion has a dimension equal to or less than 50 μm in a radial direction from a center of the application needle.

4. The liquid application unit according to claim 1, wherein at least one of the first shape portion and the second shape portion is arc-shaped.

5. The liquid application unit according to claim 1, wherein at least one of the first shape portion and the second shape portion is linear.

* * * * *